United States Patent [19]

Cardaire

[11] Patent Number: 4,745,424
[45] Date of Patent: May 17, 1988

[54] METHOD FOR PRODUCING AN EVOLUTIVE PHOTOGRAPHIC COMPOSITION AND COMPOSITION THUS OBTAINED

[76] Inventor: Jean-Claude Cardaire, 2 rue du General Leclerc, F-80400 Ham, France

[21] Appl. No.: 32,453
[22] PCT Filed: Jun. 19, 1986
[86] PCT No.: PCT/FR86/00210
  § 371 Date: Apr. 3, 1987
  § 102(e) Date: Apr. 3, 1987
[87] PCT Pub. No.: WO87/00302
  PCT Pub. Date: Jan. 15, 1987

[30] Foreign Application Priority Data

Jun. 25, 1985 [FR] France ............... 85 09663

[51] Int. Cl.⁴ ............................................. G03B 15/00
[52] U.S. Cl. .................................. 354/354; 273/157 R; 354/110; 354/291
[58] Field of Search ............... 354/80, 94, 107, 110, 354/111, 118, 120, 290, 291, 292, 354; 355/40; 273/157 R, 157 A

[56] References Cited

U.S. PATENT DOCUMENTS

| | | | |
|---|---|---|---|
| 242,709 | 6/1881 | Stranders | 273/157 R |
| 257,102 | 4/1882 | Stranders | 273/157 R |
| 258,651 | 5/1882 | Ireland | 273/157 R |
| 689,361 | 12/1901 | Moe | 355/40 |
| 1,372,811 | 3/1921 | Hall | 352/48 |
| 1,676,641 | 7/1928 | Eschenbach | 273/157 R |
| 1,737,021 | 11/1929 | Pollock | 354/110 |
| 1,867,800 | 7/1932 | Bhosys | 354/291 |
| 2,329,384 | 9/1943 | Bollinger | 354/354 |

FOREIGN PATENT DOCUMENTS

A-2203991 10/1972 France.

OTHER PUBLICATIONS

*The Focal Encyclopedia of Photography*, copyright 1960, pp. 738–739, definition of "montage"..

Primary Examiner—Russell E. Adams
Attorney, Agent, or Firm—Scully, Scott, Murphy & Presser

[57] ABSTRACT

The evolutive photographic composition comprises on the one hand a basic photograph representing a given still on which, on the other hand, is placed a set of photographic elements obtained by taking a picture, in the same still, of an evolutive subject occupying for each shot a different position or a different attitude, and by cutting said shots according to the contour, precise or not, of the subject so as to more or less isolate the subject, said basic photograph and said photographic elements being provided with magnetized adhesive means or the like enabling to detachably fix them to the basic photograph. When a precise cut-out is effected, an optical pen reader or a pick-up connected to a computer controlling a laser cutter or the like can be used.

17 Claims, 2 Drawing Sheets

METHOD FOR PRODUCING AN EVOLUTIVE PHOTOGRAPHIC COMPOSITION AND COMPOSITION THUS OBTAINED

The game entitled "puzzle" is known, which game consists in reconstituting an image by juxtaposing, in an appropriate manner, elements obtained by cutting the image along a more or less complicated contour. It is self-evident that the image produced is always the same and cannot be modified.

On the other hand, in the technique of the recording of an animated drawing, recourse is currently had to the special effects technique, which consists in causing a moving subject to evolve, on an invariable background landscape, without having to redesign the landscape for each image filmed. In order to achieve this, the subject is painted in each one of its positions on a transparent sheet which is then applied in the appropriate position to the drawing representing the landscape. As the subject is opaque, it masks the subjacent portion of landscape, while the remainder of the landscape is visible by transparency. A variant of this process is utilized in the filming of certain sequences of film, using real people. The people are filmed in the studio against a transparent neutral background, and the scenery is filmed without the people. The film of the people is then projected in superposition on that of the scenery, in such a manner as to give the illusion that the scene thus reconstituted was actually filmed.

Thus, in all these known processes, the evolutive subject is filmed separately in a frame which is not that of the final film.

The present invention relates to a method for producing an evolutive photographic composition, which method is distinguished from the above-mentioned methods in that the subject which it is desired to represent at different locations of the photograph is photographed in the particular frame in which it evolves.

To this end, the method according to the invention is defined in that it consists in photographing the scenery alone, that is to say the elements of the landscape which are intended to remain unchanged in the photographic composition, in causing a predetermined grid of registration lines to appear on the basic photograph thus obtained, and then, without moving the camera, in photographing, as many times as is desired, the evolutive subject by placing it on each occassion at a different location of the same landscape, in such a manner as to obtain a plurality of prints, each marked with the same grid of registration lines as the basic photograph, and which are distinguished from one another only by the position of the subject, in cutting the said prints along the registration lines of the grid, in such a manner as to isolate the element or the elements containing the variable subject, and then in producing evolutive images by applying at least one of the said elements of at least one of the prints to its corresponding location on the basic photograph.

The grid of registration lines may be formed by a pattern on the scale of the final print, which is placed on the ground glass screen of the viewfinder of the camera. This pattern may conprise a mesh which is square, rectangular or of any other appropriate shape, provided that the mesh is identical for all the prints which are made.

It will be clearly noted that the method according to the invention has nothing in common with a puzzle, because in the latter the puzzle pieces are all unique and represent image elements which can occupy only a single place in the final composition, while in the present method the variable subject can be placed, at the discretion of the owner, on one day at a given location on the basic photograph and on another day at a different location, while restructuring or while destructuring the image. The cut photograph elements which are applied to the basic photograph conceal the subjacent positions of the latter, but are perfectly integrated into the overall landscape, given that the said elements represent around the subject portions of scenery which are identical to those of the said basic photograph.

It is likewise understood that the composition according to the invention is clearly distinguished from the animated drawing or from the special effect films which have been mentioned previously, since in the latter the subject is filmed against a neutral background which is, for example, transparent, while in the present case the subject is photographed in the actual landscape in which it evolves.

The subject may be formed by a person or a group of persons, by animals, by various accessories, furniture etc. . . . , which are photographed in a given frame, for example in a set of premises or in an exterior landscape. It will be possible for the composition to show on one day the unadorned landscape, on another day the said subject or the said subjects at a point of the landscape, or on yet another day the same or other subjects in the same landscape, this being achieved by manipulating the elements containing the subject or the subjects.

The method according to the invention may find a multitude of interesting applications in the most widely varying fields.

Thus, a portrait or a family photograph is frequently monotonous, because they represent constrained subjects. The method according to the invention permits these to be made more alive, by modifying from time to time the location or the orientation of one of the subjects or of several subjects.

On the other hand, it is possible to produce educational games based on the method according to the invention, for the purpose of teaching disciplines as varied as the highway code, astronomy, meteorology, advertizing, decoration and, more generally, all the disciplines in which an element of landscape changes its shape or its position within unchanging scenery.

Advantageously, the elements of the photograph should be fixed in a removable manner onto the basic photograph by any appropriate means, in such a manner as to be able to remove them subsequently, for example for the purpose of replacing them by other elements, it will, for example, be possible to cause them to adhere by means of blocks or of reusable self-adhesive tapes of the "scotch 3M" type or of strips known under the trade mark "VELCRO". The said elements may again be affixed to magnetic plates, while the basic photograph is affixed to a ferrous metal support or vice versa.

An embodiment of the method according to the invention will now be described with reference to the accompanying drawings, in which.

Figure 1:
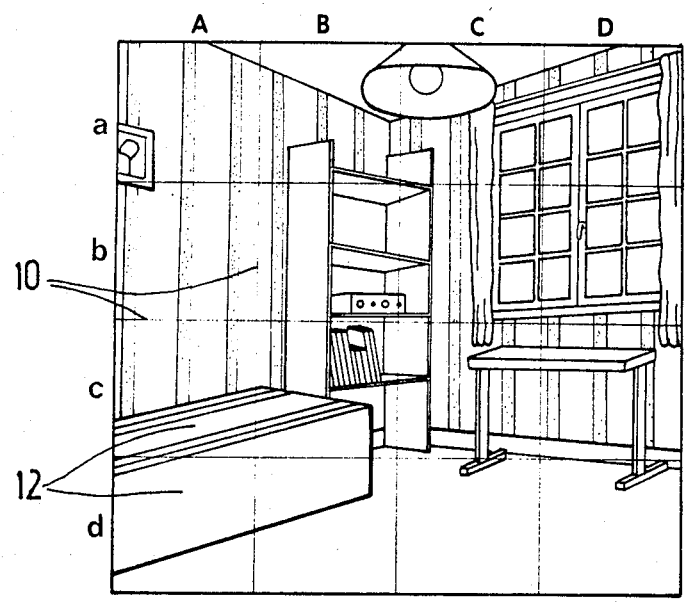
FIG. 1 shows a basic photograph representing a furnished room without any person present.
Figure 2:
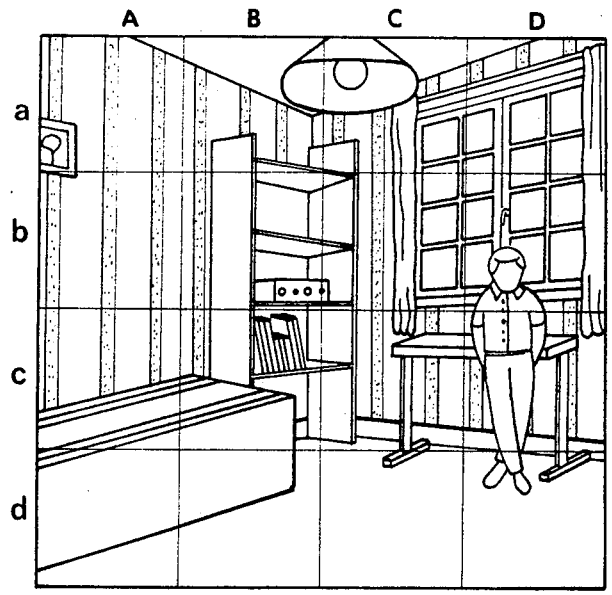
FIGS. 2 and 3 show respectively photographs of the same room, in which a child occupies two different positions.
Figure 3:
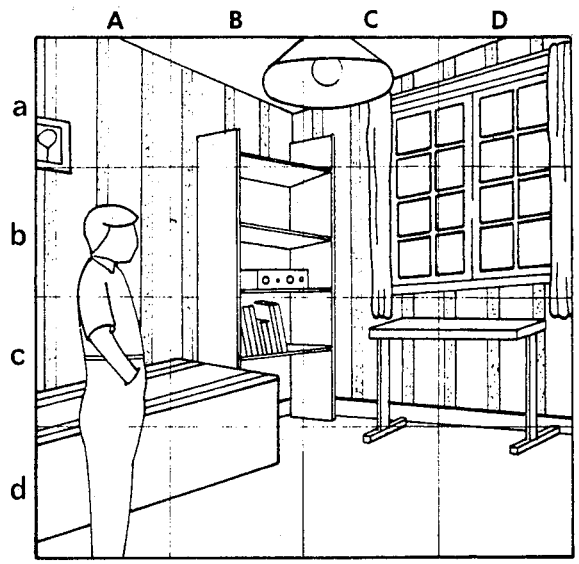
Figure 4:
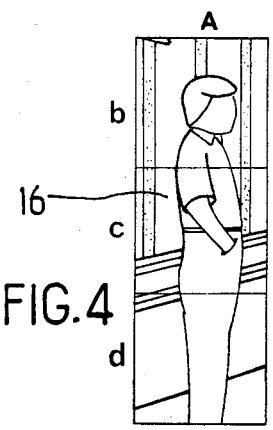
Figure 5:
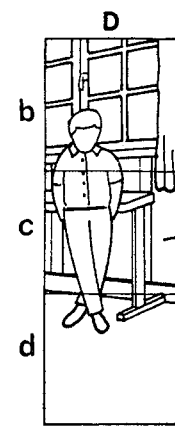
Figure 6:
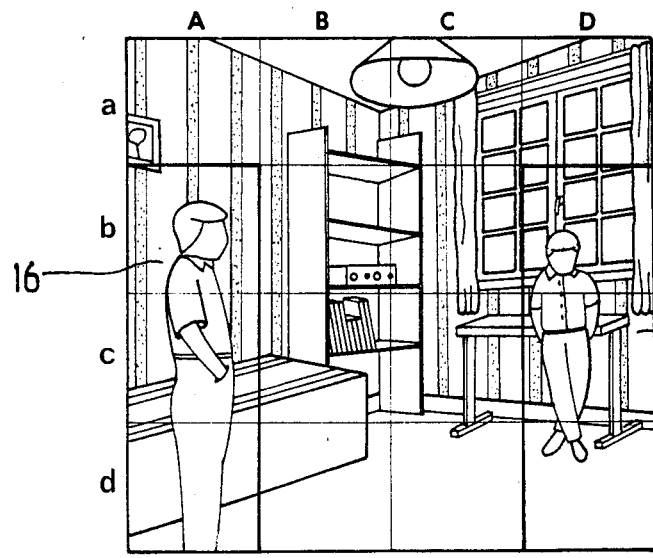

FIGS. 4 and 5 represent two elements of photographs, which elements are cut on the photographs of FIGS. 2 and 3 along the registration lines; and FIG. 6 is an example of composition which can be produced by means of the photographs of FIGS. 1, 4 and 5.

It is self-evident that the drawings are given only by way of non-limiting example, solely for the purpose of explaining the principle of the invention. It is possible to envisage that, instead of replacing elements by others, it is possible to remove or to accumulate elements, the principle of photography and of technique remaining the same: by way of example, a landscape photographed at various hours of the day, or in different seasons, so that certain elements will be those of the day while others will be those of the night or, in turn, of the summer or winter etc. . . .

As has already been stated, the invention is applicable to all types of photographs representing people, animals or objects etc. . . . , in any frame whatsoever.

The photograph represented in FIG. 1 was taken by means of a camera mounted on a tripod, the ground glass screen of the viewfinder of which camera is equipped with a pattern of registration lines.

It is also possible to take this photograph by means of a camera without a ground glass screen, provided, however that there has been placed in a suitable manner, depending upon the type of camera in front of, on or behind the sighting lens, a pattern or any other geometrical grid of registration lines, precisely on the scale of the pattern of registration lines which is found on the image obtained. When this image is printed, an optical mesh formed by a pattern or any other geometrical grid is placed in such a manner as to obtain on the positive the registration which corresponds to that of the sighting the sighting lens. This may be carried out in several ways, at the stage of taking the photograph or at the printing stage.

One method involves the use of a special margin stop composed of metal wires or other threads, in contact with the photographic paper to be exposed. The other method involves the use of a film or of a transparent glass plate marked with the grid of registration lines and placed in contact with the developed negative to be printed. A third method involves the use, when the photograph is taken, of a film or of a transparent glass plate marked with the pattern of registration lines and placed in contact with the unexposed negative in the chamber of the camera, and the developed negative will then be directly marked by the grid of registration lines. This may also be done in any other manner.

On the photograph shown in FIG. 1 there thus appears a pattern of lines 10, which defines a plurality of photographic elements which are identified in FIG. 1 by means of the coordinates A to D and a to d. In the case illustrated, the pattern is square, but this may also be given any other geometrical shape, such as rectangular, triangular of even less regular shapes.

Without changing the position of the camera or the viewfinder or the taking lens, and with the same conditions of illumination (all these data may be reconsidered for particular applications which will be explained below), photographs in FIGS. 2 and 3 are then taken of the same scenery, while placing the subject, for each photograph, at different locations in the room. It is necessary to provide for a large depth of field, in order to avoid the need for refocusing between successive photographs.

The result of this is that the photographs obtained exhibit a grid of registration lines 10 which are identical to that of FIG. 1 and which define elements of photographs which are directly superposable on those which correspond to them on FIG. 1. For each photograph, it is possible to vary not only the position of the subject, but also the subject itself. For example, it is possible to introduce another person or several persons, an animal or an object.

Starting from all the photographs obtained in this manner, it is possible to produce an evolutive photograph. In order to do this, the photograph elements which include the subject are cut on the said photographs along the registration lines 10. For example, on FIG. 2, the strip 14 which is shown in FIG. 6 and which is formed of the elements Db, Dc and Dd is separated. Likewise, in FIG. 3, the strip 16, which is formed of the elements Ab, Ac and Ad, and which is represented in FIG. 5, is cut out. In the examples shown, the evolutive subject involves three vertically aligned elements, but it is self-evident that it may include one or more elements arranged in any manner whatsoever, and these elements may or may not be cut out along the registration lines.

One or more of the said strips or elements cut out may then be applied to the basic photograph of FIG. 1. Thus, during a certain period of time, the latter will be exhibited in its initial state. Sometime afterwards, it will be possible to apply the strip 14 to it, in order to obtain the photograph of FIG. 2. At some other time, it will be possible to remove the strip 14 and to fix the strip 16, in order to obtain the photograph of FIG. 3. It will in turn be possible to apply the two strips 14 and 16, in order to obtain the photograph of FIG. 4.

With several photographs, it will thus be possible to produce an evolutive photograph having a large number of combinations of positions of the subject.

It is thus possible to restructure an image or even to destructure this image and to become "creative" in one's picture (and even to remove certain elements from the image).

As has already been explained, it must be possible for the elements to be fixed in a detachable manner on the basic photograph and without damaging the surface of the latter. For example, they may be applied to an iron plate, and the basic photograph to a magnetic support, or vice versa. Alternatively, the said basic photograph elements may be provided, on their reverse side, with strips of the "VELCRO" brand type, for application of the method on fabrics. Furthermore, they may receive on their reverse side a reusable double-face adhesive surface of the "3M" brand type. Alternatively, any other means for temporary fixing may be employed.

In the case where the basic photograph is not marked with a grid of lines, it is presented in the form of a conventional image. The supplementary elements (people, objects, etc. . . . ) may be plated and joined to the basic image with reference to the natural registration lines of this image, by simple cutting out. The fixing of the elements to be adapted to the basic image is as indicated above, by any means for temporary fixing.

A variant would consist in cutting out the subject or subjects to be placed on the basic image following their own contour. In this manner, a precise silhouette is obtained. The subject, removed from its environment in this manner, may be replaced on the basic image, whether patterned or not.

In order to carry out this rather delicate outlining, in a convenient and rapid manner, the photographs being printed in the desired format, affixed to the previously described appropriate support and permitting their juxtaposition, it is possible to contemplate, inter alia, the use of a reader of the optical pen or sensor type, connected to a computer recording the trace of the subject or subjects to be cut out.

Proceeding from these data recorded by the computer, it is possible to contemplate the use of the latter to drive a laser cutting system or some other such system.

In the limiting case, the pattern of registration marks in the viewfinder may be dispensed with, but this continues to be very practical for the purpose of facilitating the centering and the arrangement of the subjects or objects to be placed.

It is also possible to contemplate the use of other taking lenses and of differing illumination conditions for an artistic implementation of the invention and in accordance with the desire of the user. For example, the basic image is produced with a wide angle, and the supplementary images are produced with a telephoto lens or a so-called standard lens, in such a manner that the elements to be added to the basic image are elements comprising large areas of detail, or vice versa.

It is thus possible to envisage, according to the invention, a basic image produced in black and white and the elements to be added being produced in color, or vice versa.

The conditions of illumination may vary at will: for example, a landscape photographed at various times of the day in order to show the time which passes by placing elements on the basic image or removing them therefrom.

Conversely, it is also possible to contemplate a situation in which the basic image represents a photograph including many people in a landscape, and landscape elements not including any people are placed, according to the invention, on the people so as to remove, or to cause to reappear, one or another of the people according to the imagination.

It is also possible, according to the invention, to replace on the basic image one or more subjects which were forgotten when the initial photograph was taken, or to reintroduce other subjects subsequently. For example, on the basic image of a young married couple, it is possible to contemplate subsequent replacement of the child or children of this couple.

It is sufficient, when the initial photograph is taken, to provide for the underexposure of a negative, which will be replaced on the ground glass screen of the viewfinder of the camera, or in any other manner, for the purpose of re-establishing the centering of the original basic image, and to re-photograph the new subjects, as indicated previously, by sighting through this negative, which is thus relatively transparent.

It is clearly understood that the act of using such an underexposed negative is simply a supplementary facility, experience showing that a negative which has been normally exposed transmits a sufficient amount of light for the purpose of effecting correct recentering.

I claim:

1. A method for producing an evolutive photographic composition, which method consists in photographing with a camera the scenery alone, that is to say elements of landscape which are intended to remain unchanged in the photographic composition, causing a predetermined grid of registration lines to appear on the basic photograph obtained in this manner, in order to facilitate handling, and then, without moving the camera, or by replacing it at the same location very accurately, in photographing as many times as is desired, the evolutive subject by placing it, or by replacing it on each occasion, at a different location, or in a different orientation, with respect to the same landscape, in such a manner as to obtain a plurality of prints, each marked with the same grid of registration lines as the basic photograph, and which are distinguished from one another only by the position of the subject, in cutting the said prints along registration lines of the grid, or the natural lines existing in the photograph, for the utilization of the method, without causing the appearance of the grid of registration lines, which is solely intended to facilitate the use of the method, in such a manner as to isolate the element or elements including the variable subject, and then in producing evolutive images by applying at least one of the said elements of at least one of the prints to its corresponding location on the basic photograph.

2. The method as claimed in claim 1, which consists in placing on either the rear screen or the front screen of the viewfinder, a mesh of registration lines, and then, at the printing stage, in placing on the negative obtained a device which permits the formation, on the positive, of a mesh identical to that which is situated on the screen of the viewfinder, the said device being constituted by a film or a transparent screen marked with the square pattern.

3. The method as claimed in claim 1, which consists in placing on the screen of the viewfinder, a mesh of registration lines, and in placing in the dark chamber part of the camera, in contact with the unexposed negative, a screen or a transparent film marked with the same grid of lines as that of the viewfinder.

4. The method as claimed in claim 1, which consists in placing on the screen of the viewfinder, a mesh of registration lines, and then, at the printing stage, in placing on the positive a device permitting the formation, on the photograph, of an identical mesh, on the scale of that placed on the viewfinder, the said device being constituted by a margin stop composed of wires.

5. An evolutive photographic composition, implementing the method as claimed in claim 1 which composition comprises, a basic photograph representing a given set of scenery, and on which there is marked a square pattern of registration lines (10), which define unit photograph elements (12) on the said photograph, and, a set of photograph elements (14, 16) obtained by photographing, in the same scenery with the same optical systems, an evolutive subject occupying, for each photograph, a different position or expression, and then in cutting out the said photographs along the registration lines in such a manner as to isolate the subject, the said basic photograph and the said photograph elements being provided with detachable means permitting the photograph elements to be fixed in a detachable manner on the basic photograph.

6. The evolutive photographic composition as claimed in claim 5, wherein the said photograph elements and the said basic photograph may be affixed to reinforcing supports which are intended to rigidify them.

7. The evolutive photographic composition as claimed in claim 5, wherein the said detachable means are formed by bands referred to as "VELCRO", which are affixed to the reverse side of the supports of the photograph elements, being applied to the basic photograph in webs.

8. The evolutive photographic composition as claimed in claim 5, wherein the said detachable means are formed by reusable double-face adhesive strips or blocks, which are affixed to the reverse side of the supports of the photograph elements to be placed temporarily on the basic photograph.

9. The evolutive photographic composition as claimed in claim 5, wherein the said photograph elements are affixed to ferrous metal supports, while the basic photograph is affixed to a magnetic plate, or vice versa.

10. The evolutive photographic composition as claimed in claim 1, wherein the basic image is produced by virtue of the use of a taking lens of the wide-angle type, and the elements to be added thereto are produced by virtue of the use of a taking lens of the telephoto type, or vice versa.

11. The evolutive photographic composition as claimed in claim 5, wherein the elements to be added to the basic image are deliberately placed outside the limits of this image, in such a manner as to destructure the initial image.

12. The evolutive photographic composition as claimed in claim 1, which composition is defined by the use of an underexposed negative placed on or under the sighting screen, of a first view, to place subsequently, on the basic image, elements which were absent when the initial view was taken.

13. The evolutive photographic composition as claimed in claim 1, which composition is defined in that the basic image is in black and white, and the elements to be added thereto are in color, or vice versa.

14. The evolutive photographic composition as claimed in claim 1, which composition is defined by the accumulation of elements on the basic image, one on top of the other, in order to obtain an image which is evolutive in thickness, by removing or by replacing the elements on the basic image, or vice versa.

15. The evolutive photographic composition as claimed in claim 1, which composition is defined in that the basic image includes numerous people and the elements to be added to the basic image include the same scenery without any person, in order to cause them to disappear progressively as the elements are placed on the basic image.

16. The evolutive photographic composition as claimed in claim 1, which composition is defined by the use of the method at different times, by replacing the camera at the same location very accurately for chronological operations in the works construction style or otherwise, in order to cause the elements which have changed during this time to appear on the basic image progressively.

17. The evolutive photographic composition as claimed in claim 1, which composition is defined by the use of a computer controlling a reader of the optical pen type and a cutting system which is of the laser type, in order to cut out the supplementary images to be placed on the basic image, along their own contour.

* * * * *